Patented Sept. 12, 1922.

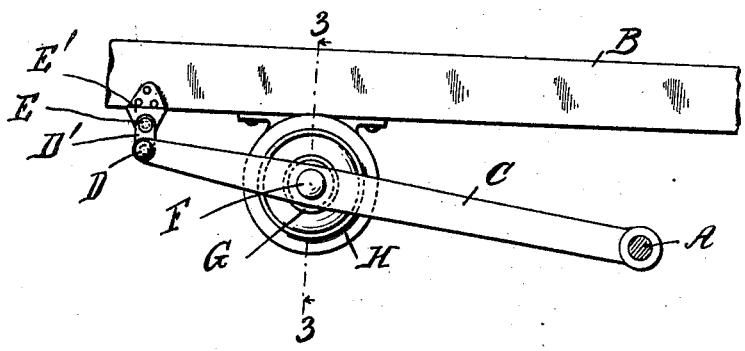
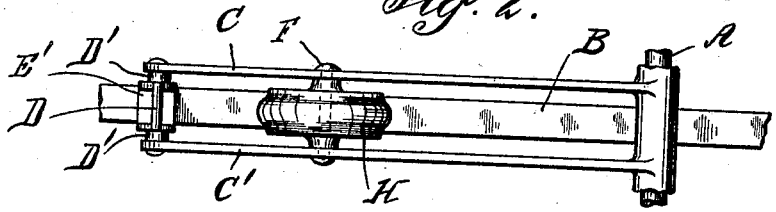
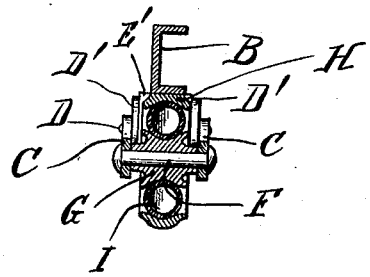

1,428,699

UNITED STATES PATENT OFFICE.

HILDING LÜBECK, OF HERSERUD, SWEDEN.

SPRING SUPPORT FOR VEHICLES.

Application filed November 20, 1919. Serial No. 339,289.

*To all whom it may concern:*

Be it known that I, HILDING LÜBECK, a subject of the King of Sweden, residing at Herserud, Sweden, have invented certain new and useful Improvements in Spring Supports for Vehicles, of which the following is a specification.

This invention relates to spring supports for vehicles, particularly power-driven vehicles, such as automobiles, and its object is to provide an improved and very effective spring arrangement between the axles and the frame of the vehicle. The advantages of my present invention will appear fully from the description following hereinafter, and the novel features will be pointed out in the appended claim.

In the accompanying drawings, forming part of this specification, I have shown as an example one form of carrying out my invention. It is to be understood that the form shown is an example only, and that various changes and modifications may be made without departing from the spirit of my invention.

In these drawings, Fig. 1 is a side elevation of my improved spring support, with parts in section; Fig. 2 is a bottom view thereof; and Fig. 3 is a vertical section on line 3—3 of Fig. 1.

A represents an axle, say the rear axle of an automobile, with which is connected at a convenient point, preferably in substantial vertical alignment with one of the lateral frame members B, a connecting member which, in the form of my invention illustrated, may consist of two levers C, C', substantially parallel to each other and extending preferably lengthwise of the frame B. The levers C, C', are at one of their ends pivotally connected, as as D, preferably with links D', the latter being fulcrumed, as at E, on a bracket E' rigidly secured to the frame B. At a point between the axle A and the pivot D, the levers C, C' are connected by a pin F, the latter forming a support for a ring- or sleeve-like member G formed preferably with a concave outer surface. Surrounding this member G is another ring-like member H, carried by the frame B and preferably secured thereto rigidly. This ring H has preferably a concave inner surface facing the concave surface of the ring G, and interposed between these concave surfaces are spring means, which in the embodiment of my invention illustrated in the drawings, consist preferably of a pneumatic tire. This tire spaces the two rings from each other and holds one of the rings normally in a substantially concentric position with respect to the other.

It will be seen that during the travel of the vehicle any up-and-down movement of the axle A will be transmitted to the levers C, C', the latter swinging on their pivot D, and such movement will be taken up by the spring means interposed between the ring G on the levers C, C' and the ring H on the frame, and will thus be communicated to the frame but softly and without shock. Owing to the special link connection, however, between the connecting member C, C' and the frame B, this connecting member, and therefore also the axle A, is also capable of a slight movement lengthwise of the frame B, and any shocks in this direction will also be taken up by the spring member I. A very effective spring action is thus provided, which has important advantages over the customary leaf-spring arrangement. While in the latter arrangement the connection between the axle and the frame is effected by flexible members, which owing to their exposure to rain and dirt are liable to rust and break, I provide according to my invention, a substantially rigid connecting member, and the only flexible part is the tire or other spring member interposed between the rings G and H, and this spring member can be easily replaced in case of need.

It will be observed that the two arms or levers forming the connecting member C, C' are located substantially symmetrically on each side of a longitudinal vertical plane containing the frame member B, so that the spring member, which is held between the two arms or levers, will be located in such longitudinal vertical plane.

As pointed out above, the drawings are to be considered as illustrative of one example only of carrying out my invention, and various modifications may be made within the scope of my invention, as defined in the appended claim.

I claim as my invention:

In a spring support for vehicles, the combination with the vehicle frame and a wheel axle, of a lever, pivotally connected with said frame and said axle, so as to allow the lever not only to swing with respect to said frame, but also to move lengthwise thereof, a ring carried by said lever between said axle and the point of oscillation of the lever, another ring carried by said frame and arranged substantially concentric with said first named ring, and a pneumatic tire interposed between said rings.

In testimony whereof I affix my signature.

HILDING LÜBECK.